United States Patent Office 3,321,651
Patented May 23, 1967

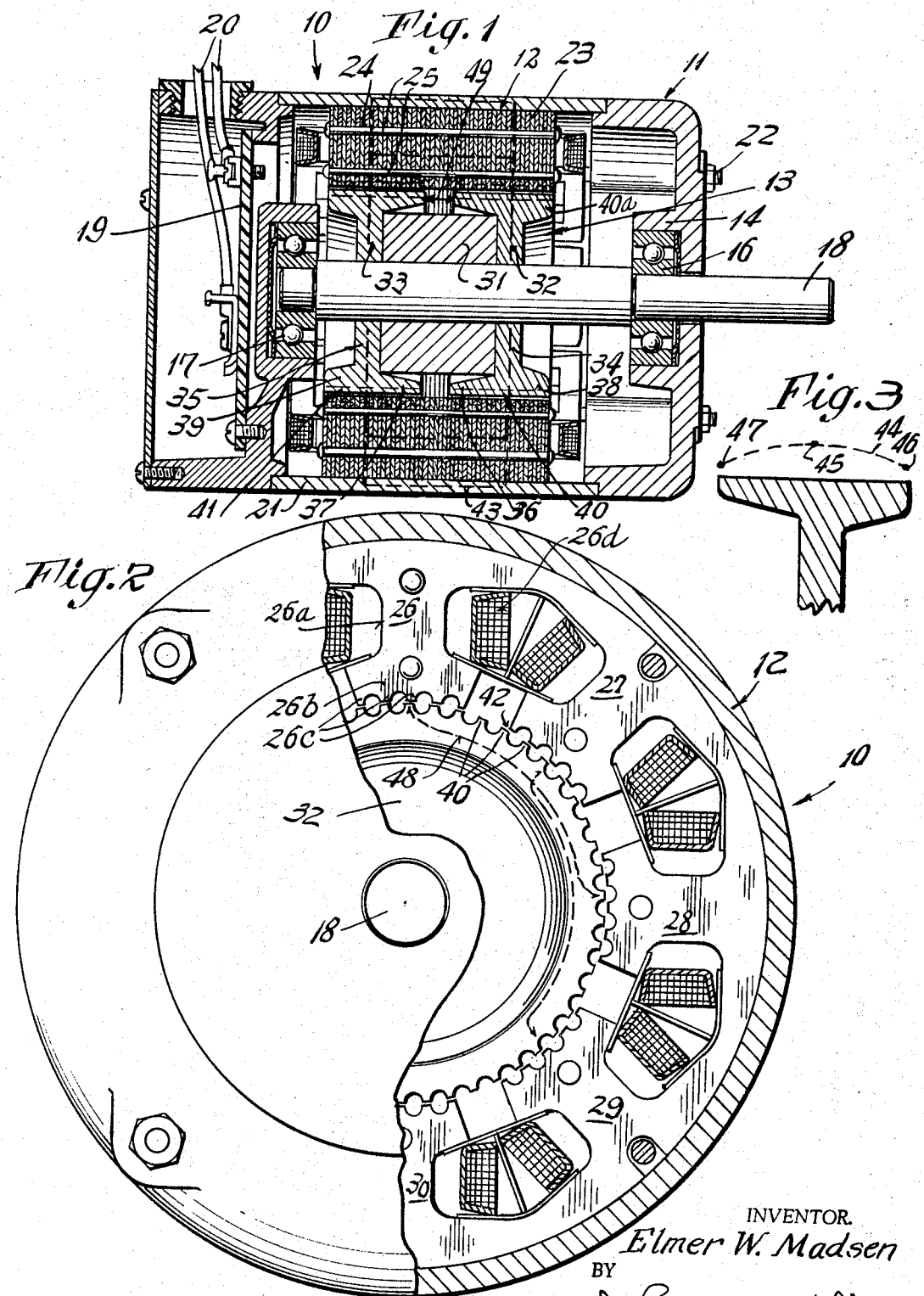

3,321,651
ELECTRIC MOTOR
Elmer W. Madsen, Bristol, Conn., assignor to The Superior Electric Company, Bristol, Conn., a corporation of Connecticut
Filed July 28, 1964, Ser. No. 385,593
4 Claims. (Cl. 310—156)

The present invention relates to an electric motor which produces incremental rotative movement or steps and more particularly to such a motor which includes a permanent magnet carried by the rotor.

In U.S. Patents Nos. 2,931,929 and 2,982,872, both assigned to the assignee of the present invention, there is disclosed an electric motor that has a stator provided with windings and a rotor which includes a permament magnet such that changes in energization of the windings produce incremental rotational steps of the rotor. Both the rotor and stator have radially aligned peripheries on which axially extending teeth are formed with the extent of each incremental step being related to the pitch of the teeth. Though such a motor has been found satisfactory, it has been found desirable to increase the speed of the motor, i.e., the number of steps which the motor may take per second without loss of a step and also to provide an increase in the output torque of the motor.

An attempt to achieve the faster stepping and increased output torque through the increase in the magnetization of the stator by increasing the energization of the windings has not been found satifactory and moreover has been found to actually decrease the output torque and speed of response of the motor. On the other hand, changes in the rotor as by increasing the size of the permanent magnet to increase the permanent magnetic flux produced thereby has also been found to be ineffectual to produce the desired qualities by reason of the increase in the weight and hence moment of inertia, failing to provide a correspondingly or even greater increase in the output torque and speed of response.

It is an object of the present invention to provide an electric motor of the above type which has both an increased speed of response and also which has a higher output torque than similar sized motors.

Another object of the present invention is to provide an electric motor that achieves the above object by more efficiently distributing and controlling the effect of the coaction of the magnetic fluxes of the stator and rotor.

A further object of the present invention is to provide a rotor of the above type which is relatively economical to produce and which may be easily incorporated into presently existing motors.

In the hereinafter disclosed embodiment of the invention, the stator is similar in construction to that shown in the above-described patent and thus includes an annular member formed to provide poles with the inner periphery of the poles being concavely arcuate and being shaped to provide axially extending peripheral teeth. A winding is magnetically associated with each of the poles to magnetize the poles with the necessary magnetic polarity in the proper sequence, with the flux produced by the poles being referred herein as an A.C. flux as it may be derived from an A.C. source when the motor is employed as an A.C. running motor or a controlling circuit when the motor is employed as a stepping motor. The rotor includes a permanent magnet which is carried by the shaft and is polarized axially. For creating the path of the permanent magnetic flux produced by the magnet, an end cap is mounted at each end of the magnet with each end cap having a circular peripheral portion closely spaced to the stator pole peripheries with the periphery of each end cap also being formed to have evenly spaced axially spaced teeth.

In accordance with the present invention wherein an increased speed of response and an increased torque are achieved the end caps are made of unitary pieces of metal, such as sintered iron or relay steel, and they include a central annular portion and a peripheral portion of greater axial thickness than the annular portion. Moreover, the peripheral portion extends outwardly in both axial directions from the central portion to at least the corresponding radially aligned edges of the stator poles, if not beyond. With this construction of the end caps, the central portion is thus caused to be substantially saturated by the D.C. flux produced by the permanent magnet but yet the periphery of each end cap is shaped to cause a lesser degree of saturation than the central portion and in addition to substantially uniformly distribute the D.C. flux about its periphery. The A.C. stator pole flux is caused to flow in a path that includes the peripheral portions of the end caps and as these portions are not saturated by the permanent magnet flux, the stator flux encounters less reluctance. Moreover, the total sum of the flux in the peripheral portion is also made to be less than that required to saturate the portions and thus each may traverse its own path without substantial disturbance by the other.

Thus not only has the flux distribution been more evenly distributed thereby increasing the output torque by an increase of action of the fluxes but in addition, by the above-described construction of the end caps, the moment of inertia of the rotor is only somewhat increased, if at all, thereby enabling both an increase in the speed of response of the motor and its output torque.

Other features and advantages will hereinafter appear.
In the drawing:

FIGURE 1 is an axial section of the motor of the present invention.

FIG. 2 is an end view with a portion broken away to show details of construction.

FIG. 3 is a detail somewhat enlarged of a portion of an axial section of an end cap.

Referring to the drawing, the motor is generally referred to by the reference numeral 10 and includes a housing 11 constituting part of a stator 12 and a rotor 13 that is mounted for rotational movement. The housing 11 includes a pair of end bells 14 and 15, each of which mounts a roller bearing 16 and 17 respectively with a shaft 18 of the rotor 13 extending thereto. The end bell 17 additionally includes a terminal board 19 to which exteriorly extending wires 20 are connected. The housing has a tubular portion 21 formed of magnetic material, for reasons which will be hereinafter apparent, and bolts 22 extend through the end bells to secure the end bells to the tubular central portion 21.

Mounted on the inner periphery of the tubular portion 21, as by a force fit, are a pair of stator pole forming members 23 and 24, formed by a single stack of laminations formed from thin, magnetic sheets held together as by rivets 25. The laminations are identical and formed of thin, magnetic sheet metal with the axial outer portions constituting the pole forming members 23 and 24. Each of the pole forming members, pole forming member 24 being shown in FIG. 2, is shaped to provide a plurality of poles 26, 27, 28, 29, 30 etc. with each having, referring to the pole 26, a reduced central portion 26a, concavely arcuate peripheral portion 26b and axially extending teeth 26c formed on the periphery. Additionally, a winding 26d surrounds the reduced portion of pole 26 to induce a magnetic flux in its associated pole. While reference has been made to pole 26, it will be appreciated that each of the other poles has a reduced central portion, an arcuate peripheral portion, teeth formed on the periphery and a winding encircling the reduced portion.

While the pole forming members 23 and 24 have been indicated as being separate portions of a unitary piece, it will be appreciated that they are identical and that each winding extends to encircle two axially aligned poles, one being in each pole forming member. If desired, the pole forming members 23 and 24 may be made as two stacks of laminations rather than one as shown. With the pole forming members 23 and 24 being separate portions of a unitary piece, it will be understood that the tubular portion 21 may be made of either nonmagnetic material or magnetic material depending upon the desirability of having one flux path, i.e. just the one piece, or two flux paths, i.e. the one piece and the portion 21 for the permanent magnet flux. If the pole forming members are made of two stacks of laminations the tubular portion 21 must be made of magnetic material to provide the low reluctance path of the permanent magnet flux. Preferably there are eight poles formed by each pole forming member with the poles being equally spaced about the circle defined by their peripheries.

The shaft 18 has mounted thereon a permanent magnet 31 that is polarized axially and secured on the shaft 18 for rotation therewith. The magnet 31 is tubular with each end surface thereof being abutted by an end cap 32 and 33. The end caps are also secured to the shaft 18 for rotation therewith as by a force fit.

The end caps 32 and 33 are identical though mounted on the shaft oppositely and are formed from one piece of magnetizable material. Such material may be sintered iron or steel and specifically relay steel, by reason of its greater permeability and low magnetic retention, has been found preferable. Referring specifically to the end cap 32, it is circular and has a central disk-like portion 34 and a peripheral flange that consists of an inwardly extending portion 36 and an outwardly extending portion 38. Similarly the end cap 33 has a central disk-like portion 35 and a peripheral flange that consists of an inwardly extending portion 37 and an outwardly extending portion 39.

The periphery of the end cap 32, as shown in FIG. 2, is formed with evenly spaced teeth 40 that extend axially with the end cap 33 also having identical teeth 41. The end caps are mounted on the shaft 18 such that when the shaft is positioned in the housing, the end caps are mounted to be radially aligned with the stator pole forming members and to define therebetween a cylindrical air gap, generally indicated by the reference numeral 42.

In carrying out the present invention it has been found that an increase in torque to inertia ratio of the rotor and in addition an increase in the steps per minute or speed of response of the motor has been increased by the above-described structure. The flux path for the flux produced by the permanent magnet 31 traverses the path indicated by the dotted lines 43 and thus passes through the portions 34 and 36, air gap 42, divides between the stator members 24 and 25 and the tubular iron shell 21, and the end cap 32 to the other pole of the magnet. The flux path thus includes the central portions 34 and 35 of the end caps 32 and 33 respectively and the width of the central portion is made so that it becomes substantially saturated with this flux. However, in order to prevent the exterior portion of the end cap where the teeth are formed from being similarly saturated and to provide for a substantially uniform distribution of the magnetic flux about the periphery of the end cap and in the air gap, the inwardly directed portion 37 is formed to have in cross-section, a decreasing width, while the outwardly directed portion 40, similarly in cross-section, has a decreasing width but is also somewhat thicker.

As shown in FIG. 3, the flux density produced just by the magnet 31 at the peripheral flange of an end cap is indicated by the dotted line 44, with the height thereof being correlated to the flux density. Thus at point 45, the flux density is the greatest and it decreases to the end points 46 and 47. The flux density, while not exactly equal over the peripheral width of the end cap, according to the present invention, is exceedingly more substantially uniform over the surface of the end cap, as compared to the heretofore suggested rotor end cap constructions. The shape of the outer portion of the end cap thus not only provides for a more uniform distribution of the flux even though the permanent magnet flux attempts to traverse the shortest, lowest reluctance path, but also increases the axial length of the air gap, both contributing to achieve the objects of the present invention. It has been found that the widest part of the flange should be at least three times the thickness of the narrowest part of the central portion to achieve the results of the present invention. Such ratio will vary with different motors and material and in one embodiment using end caps formed from relay steel, a ratio of 4½ to 1 has been found very satisfactory though 2½ to 1 is believed the minimum acceptable ratio.

When the windings are energized, assuming for example that the pole 26 is an N pole and the pole 28 an S pole, there will also be in the outer portions of the end caps a flux produced by the windings which will traverse the paths indicated by the dotted lines 48 in FIG. 2. In the outer peripheral portion of the end caps, there are accordingly two fluxes that extend transversely to each other. By reason of having a reduction in the permanent magnet flux density in the outer portions of the end caps, the reluctance of the outer portions is thus decreased, thereby increasing the density of the winding flux therein with a corresponding increase in the forces produced by the fluxes. Again the substantially uniform distribution of the permanent magnetic flux and the width of the peripheral portion enables the winding flux to have a wider path through which a greater total flux may traverse, thus increasing the turning effect of the winding flux.

In the specific embodiment of the invention disclosed herein, it being appreciated that the cross-sectional shape of the outer flange of the end cap may vary for different size motors to achieve the distribution and density of the fluxes, the outer end 40a of the outer portion 40 extends at least to the outer end of its respective stator member. The distance indicated by the arrow 49 between the inner ends of the end caps is dependent upon the strength of the magnet 31 and is selected to prevent a shorting of the magnetic flux from one end cap to the other, thus forcing the magnet flux to traverse the path indicated by the dotted lines 43.

It will accordingly be understood that there has been disclosed a motor that has a greater speed of response to changes in energization of its stator windings than heretofore accomplished and in addition for the same size and type of motor is capable of producing a greater value of output torque. The former result has been found particularly advantageous when the motor is employed as a stepping motor and the winding energized from a controlling circuit while both results have been found advantageous when the motor is utilized as an A.C. running motor with the windings energized from a source of alternating current. These results are achieved, in the specific kind of motor herein set forth, by providing a pair of end caps, each of which has a central portion and an outer peripheral portion. The central portion of each end cap has a thickness that is determined by the strength of the magnet to which it abuts so that the central portion becomes substantially saturated with the flux produced by the magnet. The outer portion, however, is of greater width than the central portion and is shaped to distribute the permanent magnet flux, somewhat uniformly over the periphery of the end cap. The length and thickness of the outer portion is not only related to the density of the permanent magnet flux, it being such as to be substantially below saturation by this flux but in addition, is related to the flux produced by the stator windings. The relationship is such that the total flux, i.e. the sum of the permanent magnet flux and stator winding flux in any part of the outer portion of an end cap is insufficient to cause saturation thereof.

Variations and modifications may be made within the scope of the claims and portions of the improvements may be used without others.

I claim:

1. An electric motor comprising a housing, a stator secured to said housing including an annular pole forming member shaped to provide a plurality of inwardly extending poles, the inner periphery of the poles being arcuate and formed with axially extending teeth and a winding associated with each pole for magnetizing the pole; a rotor including a shaft mounted for rotation in said housing and positioned to be encircled by the stator, a permanent magnet carried by the shaft and magnetized axially, a pair of end caps secured on said shaft with a cap abutting each end of the magnet and being formed of magnetizable material, each of said end caps being circular and having an annular central portion and a peripheral flange portion with the axial width of the flange portion being greater than the axial thickness of the central portion, evenly spaced axially extending teeth formed on the periphery of the flange portion, the teeth of the end caps being opposite to the teeth of the poles to define an air gap therebetween, said flange portion being shaped to provide substantially uniform distribution of the flux from the permanent magnet about its periphery without flux saturation of the flange portion and said central portion having a width which is substantially saturated by the flux from the permanent magnet, and in which the axial width of the widest part of the flange portion is at least two and one-half times the axial thickness of the thinnest part of the central portion.

2. An electric motor comprising a housing, a stator secured to said housing including an annular pole forming member shaped to provide a plurality of inwardly extending poles, the inner periphery of the poles being arcuate and formed with axially extending teeth and a winding associated with each pole for magnetizing the pole to provide a flux therein; a rotor including a shaft mounted for rotation in said housing and positioned to be encircled by the stator, a permanent magnet carried by the shaft and magnetized axially, a pair of end caps secured on said shaft with a cap abutting each end of the magnet and being formed of magnetizable material, each of said end caps being circular and having an annular central portion and a peripheral flange portion with the axial width of the flange portion being greater than the axial thickness of the central portion, evenly spaced axially extending teeth formed on the periphery of the flange portion, the teeth of the end caps being opposite to the teeth of the poles to define an air gap therebetween, said flange portion being shaped to provide substantially uniform distribution of the flux from the permanent magnet about its periphery and to provide a path for the flux from the poles with the sum of the two fluxes in each flange portion being less than the flux required to saturate the flange portion.

3. The invention as defined in claim 2 in which the teeth of the flange portion of one cap extend axially at least to the outer end of the teeth of the stator poles associated therewith and the teeth of the other end cap extend axially at least to the other outer end of the stator poles associated therewith.

4. The invention as defined in claim 2 in which the flange portion of each end cap extends axially on both sides of the central portion.

References Cited by the Examiner

UNITED STATES PATENTS

| | | | |
|---|---|---|---|
| 2,931,929 | 4/1960 | Snowdon et al. | 310—156 |
| 2,982,872 | 5/1961 | Fredrickson | 310—156 |
| 3,206,623 | 9/1965 | Snowdon | 310—156 |

MILTON O. HIRSHFIELD, *Primary Examiner.*

L. L. SMITH, *Assistant Examiner.*